B. L. LAWTON.
BEARING.
APPLICATION FILED OCT. 13, 1913.

1,093,194.

Patented Apr. 14, 1914.
2 SHEETS—SHEET 1.

Witnesses:

Inventor
B. L. Lawton
By his Attorneys

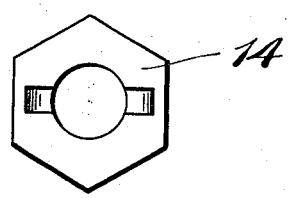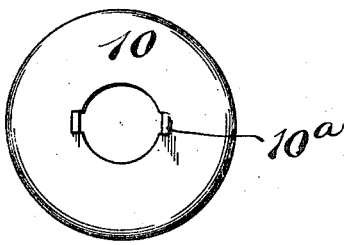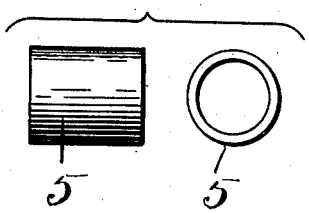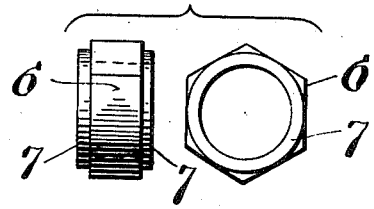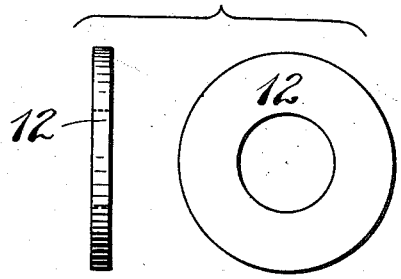

UNITED STATES PATENT OFFICE.

BURTON L. LAWTON, OF MERIDEN, CONNECTICUT.

BEARING.

1,093,194.   Specification of Letters Patent.   Patented Apr. 14, 1914.

Application filed October 13, 1913. Serial No. 794,807.

*To all whom it may concern:*

Be it known that I, BURTON L. LAWTON, a citizen of the United States, residing at Meriden, New Haven county, Connecticut, have invented certain new and useful Improvements in Bearings, of which the following is a full, clear, and exact description.

My invention relates to an improved antifriction bearing which may be employed with particular advantage as a means for connecting to a vehicle a shock absorbing device such as shown in Lawton Patent No. 1,022,145 of April 2, 1912.

Among the main objects of this invention is to provide a bearing which is so constructed as to guarantee freedom of operation, and which is also so constructed that in the event of wear, any worn or broken part or parts may be readily removed and a new part substituted.

Figure 1:
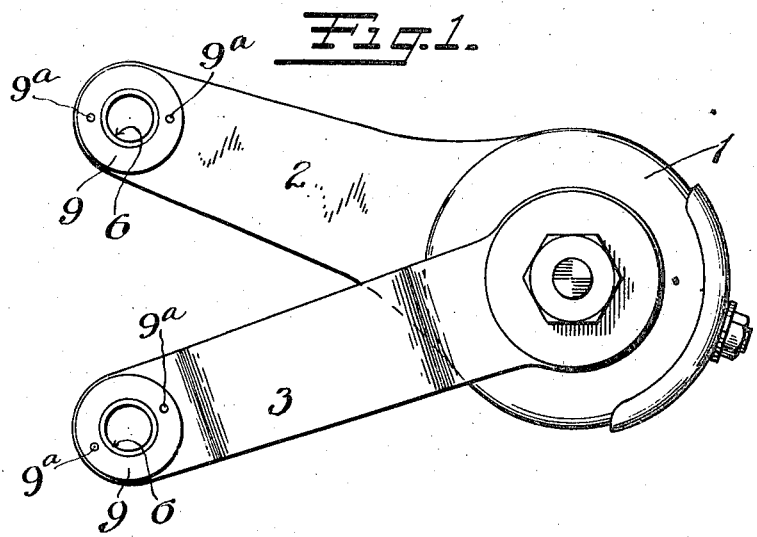
Figure 2:
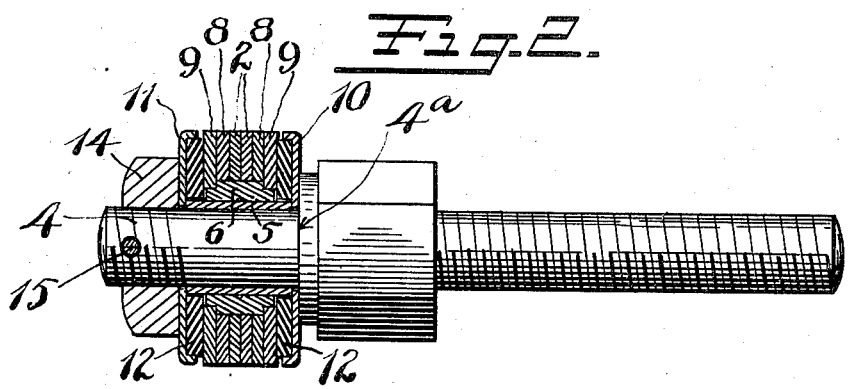
Figure 3:
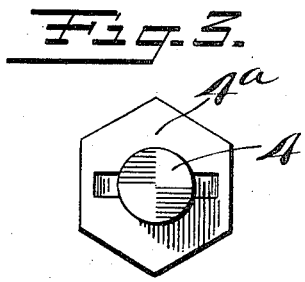

In the drawings, Figure 1 is a side elevation on a small scale of a complete shock absorber of a form suitable to be mounted on my improved end support or bearing. Fig. 2 is a relatively enlarged sectional view of the end fitting assembled on a bracket or support. Fig. 3 is a view of the outer end of the supporting bracket. Fig. 4 is a view of the inside of the holding nut. Fig. 5 is a view of the outer face of a supporting washer. Figs. 6, 7 and 8 illustrate detached details.

This invention is illustrated in connection with a vehicle shock absorber, such as shown in the aforesaid patent, the shock absorbing means being located at 1. 2—3 are arms respectively associated with said shock absorbing means, and which arms have a scissors-like movement. Obviously these arms, to be connected with the vehicle, must be provided with a suitable pivot connection at their free ends to permit the aforesaid scissors action to take place as the vehicle body moves up and down. One of these arms is pivotally connected at its end to the car body, while the other is pivotally connected to the car axle.

In Figs. 2 and 8 are shown on a relatively enlarged scale, the various parts of one of the end bearings in detail. Inasmuch as the arms of the shock absorber referred to are comparatively thin, being made from sheet metal, it is obviously necessary that the end bearing should have the capacity of supporting the shock absorber against tendency to side sway, and the most obvious means for guarding against this comprises a washer placed on each side of the arm around the pivot. It is most important, however, that the end bearings should work freely; that is to say, they should not bind to such an extent as to interfere in any way with the predesigned action of the shock absorber 1.

The present improvement, therefore, contemplates, among other things, the provision of means for preventing any one from so tightening up either end bearing as to produce the aforesaid objectionable binding action.

4 is a stud carried by a bracket of suitable design for attachment to the car body or car axle.

5 is a combined bearing-sleeve and spacer snugly mounted upon the stud 4. This part 5 is in the form of a seamless tube polished on its outer surface and constructed of a suitable bearing material.

6 is a bushing suitably secured against movement in the end of the shock absorber arm. In the present instance, the bushing 6 has an external angular middle portion, which fits into a corresponding passage in the end of the arm. The ends of the bushing are turned down into circular form, as indicated at 7—7. As shown in Fig. 2, the arm 2 is made of two thicknesses of comparatively thin sheet metal. These are located in about the center of the bushing 6, and it is, therefore, necessary to fill out the sides of the arm 2 to a thickness substantially equal to the length of said bushing. Accordingly, I apply filling-out washers 8—8 and retaining end washers 9—9 fitting over the circular ends 7—7 of the bushing and holding the bushing against endwise displacement. This group of washers building up the end of the shock absorber arm is riveted together and to the arm, as indicated at 9ª—9ª, whereby the end of the arm is made practically solid. The bushing 6 is made of an appropriate bearing metal for coöperation with the bearing metal of sleeve 5 and said bushing is provided with an annular grease groove or pocket therein which may be filled with a non-fluid lubricant. The sleeve 5 may be made from steel or iron, while the bushing 6 may be made from phosphor-bronze, or vice versa, these two metals when used in conjunction having a commonly known low coefficient of friction.

The outer faces of the washers 9—9 should, of course, be smooth to avoid abrasion against the adjacent washers.

The supporting washers are indicated at 10—11. The washer 10 has a bore preferably corresponding closely to the diameter of the stud 4 and rests against the shoulder 4ª. A suitable pin or lug 10ª preferably projects from this washer into a notch in the shoulder to prevent the washer from turning on the stud, thereby avoiding squeak. The sleeve 5 is placed over the stud 4 after the washer 10 is put in place, so that its inner end will abut against the outer face of the washer 10, as shown in Fig. 2, it being essential that the inner end of the sleeve shall take up against some fixed abutment, whereby its outer end will operate to properly space the outer supporting washer 11, as later described. When the sleeve 5 is in place, the end of the arm carrying the bushing 6 is slid over the sleeve, the bore of the bushing having a proper bearing fit upon said sleeve. The outer supporting washer 11 is then applied and finally the holding nut 14, which is screw-threaded upon the stud, is applied and screwed up to bring the parts into their predesigned operative position. The outer supporting washer 11 has a pin or lug corresponding to the lug 10ª on the washer 10 for engagement with the nut 14, so that these two metal parts may not turn one against the other, thereby avoiding squeak. Any suitable means may be provided to prevent this independent rotation of the washer 11 and nut 14, the means employed being an obvious mechanical expedient. Between the supporting washers 10—11 and the washers 8—9 are located noiseless anti-friction washers 12—12 respectively which washers are non-metallic and have bores somewhat larger than the diameter of the spacer sleeve 5. The edges of the supporting washers 10 and 11 are preferably rolled in somewhat to remove the sharp edges of said washers and to form a shallow cup to support the edges of the non-metallic parts 12—12. The non-metallic washers 12—12 are sufficiently thick so that the rolled-in edges of the supporting washers cannot by any possibility engage with any metallic portion of the end of the arm, since such engagement would be liable to cause squeak, and, in the event of excessive wear, a noticeable rattle. By employing a non-metallic material between the side supporting washers and the end of the arm, when the bearing becomes worn, as inevitably occurs in time, to such a degree as to allow the parts to have loose side slap, this side slap will not produce objectionable noise, because the non-metallic washers operate as noiseless pads and deaden the sound. The nut 14 may be of the usual castellated type and a cotter pin 15 may be employed to hold the nut against shaking loose. All the parts are so designed as to properly hold the shock absorber against side slap without binding.

From the foregoing it is apparent that it is impossible to screw up the nut 14 so as to cause objectionable binding at the end bearing, either at the initial fitting of the shock absorber to a car or after it has been in use.

A distinct advantage of the spacing means which prevents the end bearing parts from being clamped so tightly as to bind, as distinguished from any end bearing in which the parts may be intentionally or unintentionally turned up so as to bind, is that in the latter case it has been found that the non-metallic washers wear down very rapidly until binding pressure disappears and until the parts work freely. This hasty wearing down of the non-metallic parts of the supporting washers wears away a considerable portion of the noiseless pad material and it is liable to expose the turned-in metallic edge of the washer, which is liable to engage some metallic portion of the end of the shock absorber arm, as may readily be seen by reference to Fig. 2, and thereby invite squeak or undesirable rattle. On the contrary, when the spacer sleeve is employed, the supporting washers cannot be screwed up so tightly as to cause binding and grinding of the parts, and hence the wear on the non-metallic washers will be comparatively slow and a sufficient portion of the non-metallic material will stand beyond the edge of each supporting washer to protect it and to prevent squeak and rattle.

The second conspicuous advantage of the present construction, namely, the facility with which worn parts may be replaced, will now be described.

In the event the combined spacing and bearing sleeve 5 becomes worn, as is bound to occur in time even though the parts work freely, the shock absorber may be removed from the end fittings by simply removing the nut 14, whereupon the worn sleeve 5 may then be removed from the stud 4 without detaching the stud 4 from the bracket or without detaching the bracket from the car. A new sleeve may then be readily slipped into place on the stud, whereupon the shock absorber may be reapplied. Should the bushing 6 be badly worn, that may be removed and a new one substituted by simply releasing the end washers 9—9, removing the bushing and inserting a new one, then reapplying the washers 9—9. In the event the non-metallic washers become so worn as to permit an excessive amount of side slap, these washers may be readily replaced by new ones with very little effort and a minimum of cost. I prefer to employ non-metallic facing washers which are impregnated with some dry lubricant to reduce the incidental friction to the utmost degree.

What I claim is:

1. In an anti-friction bearing support for shock absorbers, a supporting stud, a pair of side supporting washers mounted thereon, a holding nut on said stud and a removable combined bearing and spacer sleeve mounted on said stud, a shoulder at one end of said stud forming a rigid abutment for one end of said sleeve, said sleeve serving to space the holding nut at a fixed distance from said shoulder.

2. In an anti-friction bearing support for shock absorbers, a supporting stud having a shoulder at one end and screw-threaded at its other end, a holding nut threaded on said threaded portion of said stud, a combined spacer and bearing sleeve removably mounted on said stud and arranged to hold said nut a fixed distance from said shoulder, a member rotatably mounted upon said sleeve, and side supporting washers carried by said stud and arranged to support said rotatable member against side slap.

3. In an anti-friction bearing support for shock absorbers, a supporting stud having a shoulder at one end and screw-threaded at its other end, a holding nut threaded on said threaded portion of said stud, a combined spacer and bearing sleeve removably mounted on said stud and arranged to hold said nut a fixed distance from said shoulder, a member rotatably mounted upon said sleeve, and side supporting washers carried by said stud and arranged to support said rotatable member against side slap, said rotatable member including a central removable bushing arranged to bear directly on said combined spacer and bearing sleeve.

BURTON L. LAWTON.

Witnesses:
R. C. MITCHELL,
E. C. WILCOX.